United States Patent
DeMaria

(10) Patent No.: US 8,942,270 B2
(45) Date of Patent: Jan. 27, 2015

(54) DIFFUSION-COOLED $CO_2$ LASER WITH FLEXIBLE HOUSING

(75) Inventor: Anthony J. DeMaria, Suffield, CT (US)

(73) Assignee: Coherent, Inc., Santa Clara, CA (US)

(*) Notice: Subject to any disclaimer, the term of this patent is extended or adjusted under 35 U.S.C. 154(b) by 1126 days.

(21) Appl. No.: 12/035,630

(22) Filed: Feb. 22, 2008

(65) Prior Publication Data

US 2009/0213885 A1 Aug. 27, 2009

(51) Int. Cl.
*H01S 3/22* (2006.01)
*H01S 3/223* (2006.01)
*H01S 3/041* (2006.01)
*H01S 3/03* (2006.01)
*H01S 3/038* (2006.01)
*H01S 3/04* (2006.01)
*H01S 3/081* (2006.01)
*H01S 3/097* (2006.01)

(52) U.S. Cl.
CPC ............... *H01S 3/2232* (2013.01); *H01S 3/041* (2013.01); *H01S 3/03* (2013.01); *H01S 3/0315* (2013.01); *H01S 3/0385* (2013.01); *H01S 3/0404* (2013.01); *H01S 3/0816* (2013.01); *H01S 3/09702* (2013.01)
USPC ...................... 372/55; 372/34; 372/61; 372/65

(58) Field of Classification Search
USPC .......................................................... 372/55
See application file for complete search history.

(56) References Cited

U.S. PATENT DOCUMENTS

| | | | | |
|---|---|---|---|---|
| 3,553,603 A * | 1/1971 | Leonard | ...................... | 372/38.05 |
| 3,781,709 A * | 12/1973 | Hintringer | ...................... | 372/107 |
| 4,493,087 A | 1/1985 | Laakman et al. | ................ | 372/64 |
| 4,787,090 A * | 11/1988 | Newman et al. | ................ | 372/82 |
| 4,959,840 A * | 9/1990 | Akins et al. | ...................... | 372/57 |
| 5,745,513 A | 4/1998 | Nishida et al. | | |
| 5,754,575 A * | 5/1998 | Sukhman et al. | ............... | 372/36 |
| 5,881,087 A | 3/1999 | Sukhman et al. | | |
| 6,192,061 B1 | 2/2001 | Hart et al. | | |
| 6,198,758 B1 * | 3/2001 | Broderick et al. | .............. | 372/36 |
| 6,198,759 B1 | 3/2001 | Broderick et al. | | |
| 6,983,001 B2 * | 1/2006 | Sukhman et al. | ............... | 372/34 |
| 7,145,926 B2 * | 12/2006 | Vitruk et al. | ..................... | 372/34 |
| 2004/0114647 A1 | 6/2004 | Sukhman et al. | | |

FOREIGN PATENT DOCUMENTS

JP 7-307506 A 11/1995
WO 97/15101 A1 4/1997

OTHER PUBLICATIONS

International Preliminary Report on Patentability received for PCT Patent Application No. PCT/US2009/000917, mailed on Sep. 2, 2010,11 pages.
Office Action received for Japanese Patent Application No. 2010-547618 mailed on Jul. 23, 2013, 6 pages (3 pages of English Translation and 3 pages of Office Action).

* cited by examiner

*Primary Examiner* — Xinning Niu
(74) *Attorney, Agent, or Firm* — Morrison & Foerster LLP

(57) ABSTRACT

A gas includes a housing having a symmetrical arrangement of upper and lower cooling members for removing heat generated in a gas-discharge excited by an electrode assembly. The electrode assembly is clamped between the cooling members and is itself essentially symmetrically arranged. The cooling members and the electrode assembly are mechanically isolated in the housing by a surrounding diaphragm-like arrangement that connects the cooling members to side-walls of the housing. An RF power-supply for supplying the electrode assembly is mounted on one of the sidewalls to avoid disturbing the symmetry of the cooling and electrode arrangements.

24 Claims, 3 Drawing Sheets

DIFFUSION-COOLED $CO_2$ LASER WITH FLEXIBLE HOUSING

TECHNICAL FIELD OF THE INVENTION

The present invention relates in general to diffusion cooled carbon dioxide ($CO_2$) lasers. The invention relates in particular to low-power (for example, having an output power of about 100 Watts or less) diffusion-cooled $CO_2$ lasers including a gas-tight housing with resonator mirrors mounted thereon.

DISCUSSION OF BACKGROUND ART

A diffusion-cooled $CO_2$ laser is a gas-discharge laser in which cooling of the discharge occurs by having a small separation between cooled electrodes forming the discharge. The separation is sufficiently small that there is a high probability excited state $CO_2$ molecules residing in a relatively long lifetime "010" bending vibration state (a non-lasing state only marginally above the ground state), can collide with the cooled electrodes. This collision process depopulates the "010" state and prevents a "population bottle neck" from developing. The depopulation of the "010" lower level, increases the population inversion in the upper "lasing" level which leads to higher laser output power and efficiency.

In such a low power laser it is usual to mount resonator mirrors of the laser as an integral part of a laser-housing. When mirrors are mounted in this way, it is important to minimize bending of the laser housing, because such bending could cause pointing of an output beam to vary with temperature.

One prior-art approach to minimizing bending of a diffusion-cooled $CO_2$ laser-housing has involved the use of a flexible housing with cooling as symmetrical as possible. Arrangements using this approach are described in U.S. Pat. No. 4,787,090 and U.S. Pat. No. 6,192,061, both assigned to the assignee of the present invention. Arrangements using a similar approach are also described in U.S. Pat. No. 6,198,758 and U.S. Pat. No. 6,983,001. While all of these arrangements have been successful to some degree, it is believed that none of the arrangements has an optimum level of actual cooling, symmetry of cooling, and flexibility of the laser housing.

SUMMARY OF THE INVENTION

The present invention is directed to providing a cooling arrangement for gas-discharge laser. In one aspect a gas-discharge laser in accordance with the present invention comprises a housing having first and second opposite longitudinal metal walls each thereof connected to third and fourth opposite longitudinal metal walls, the housing being closed by first and second end walls. Each of the first and second longitudinal walls has a rigid cooling portion surrounded by a flexible portion located between the longitudinal walls and end walls.

Preferably the cooling portion of each wall has a plurality of cooling fins extending outwardly therefrom. The first, second, third, and fourth longitudinal walls of the housing may be conveniently formed from a single extrusion of one of aluminum and an alloy of aluminum. Preferably the first and second longitudinal walls of the housing are similarly configured and the third and fourth longitudinal walls of the housing are similarly configured, thereby providing an essentially symmetrical arrangement of the housing.

In another aspect a gas-discharge laser in accordance with the present invention comprises a housing containing a lasing gas mixture, the housing having first and second opposite longitudinal metal walls each thereof connected to third and fourth opposite longitudinal metal walls, the housing being closed by first and second end walls. First and second electrodes are located in the housing, spaced apart and parallel to each other, and in thermal communication with respectively the first and second longitudinal walls of the housing. An electrical power supply is mounted outside of the housing on the third longitudinal wall and arranged to apply an electrical potential to one of the first and second electrodes. The power supply is thermally insulated from the third longitudinal wall.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
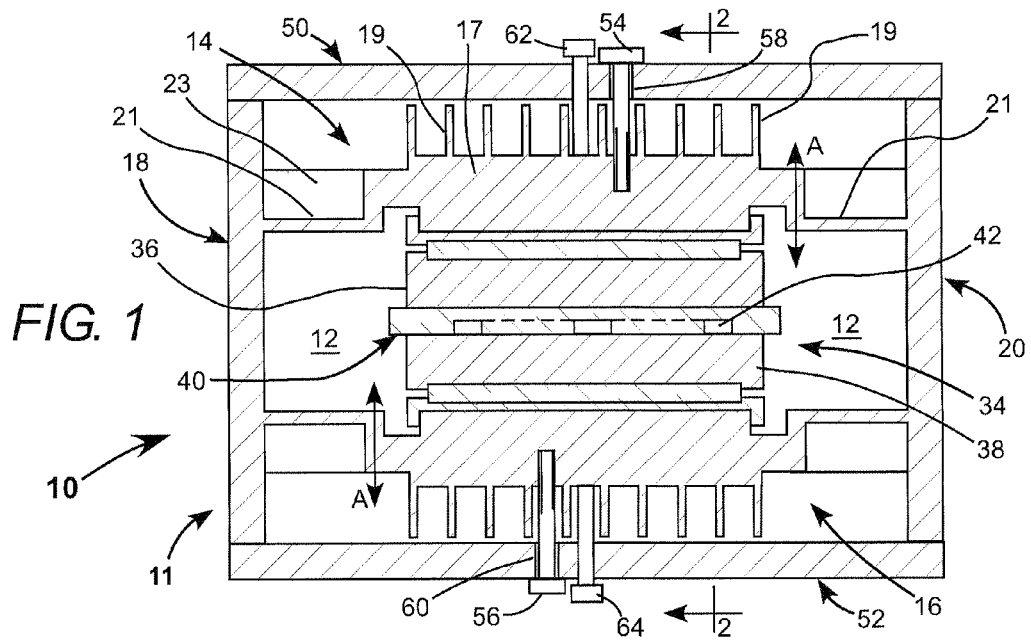
FIG. 1 is a lateral cross-section view schematically illustrating one preferred embodiment a gas-discharge laser in accordance with the present invention including an air-cooled laser housing and an electrode and discharge-channel assembly in thermal contact with rigid cooling-portions of upper and lower walls of the assembly, the cooling portions being connected to rigid sidewalls of the housing via flexible diaphragm portions of the upper and lower walls, and having cooling-fins extending longitudinally therealong.

Referring now to the drawings, wherein like components are designated by like reference numerals, FIG. 1, FIG. 1A, FIG. 2, and FIG. 3 schematically illustrate a preferred embodiment of a $CO_2$ (gas-discharge) laser 10 in accordance with the present invention. Laser 10 includes gas-tight laser housing 11 surrounding an enclosure 12, which normally includes a lasing gas mixture at a pressure less than atmospheric pressure. By way of example, one possible lasing gas mixture is a mixture of $CO_2$, nitrogen ($N_2$) xenon (Xe) and helium (He) in a percentage ratio of 12:16:5:67 respectively, and a total pressure of about 95.0 Torr.

Housing 11 has upper and lower walls 14 and 16, respectively (here, essentially identically configured), and sidewalls 18 and 20. It is assumed here that these four walls are formed in an extrusion, preferably of aluminum or an alloy thereof. The walls could be separately assembled without departing from the spirit and scope of the present invention. End walls 22 and 24, having mirrors 26, 27, 28, and 29 (see FIG. 3 for all mirrors) sealably attached thereto, complete the gas-tight housing. The mirrors define a Z-fold resonator having a twice-folded axis 30. Mirrors 26 and 29 are end-mirrors (terminating mirrors) of the resonator and mirrors 27 and 28 are fold-mirrors. It is assumed that mirror 29 is an output-mirror of the resonator.

Figure 2:
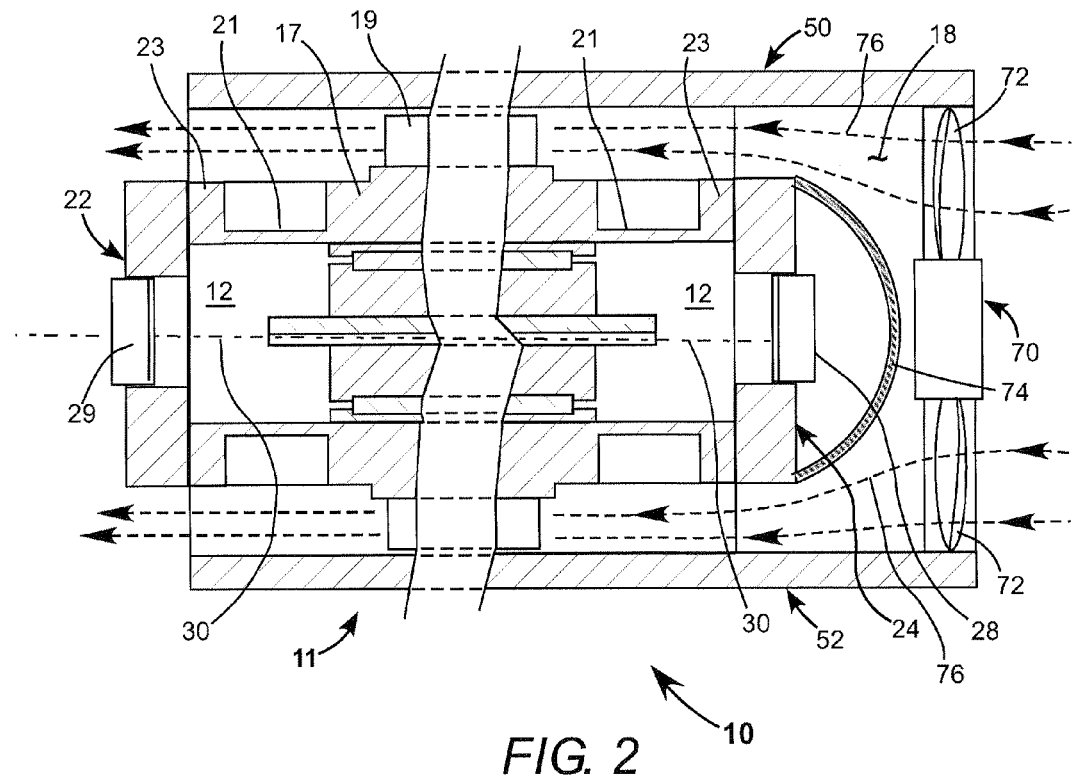
FIG. 2 is a foreshortened longitudinal cross-section view seen in the direction 2-2 of FIG. 1 schematically illustrating further details of the laser of FIG. 1 including top and bottom covers attached to the sidewalls of the housing and a fan assembly at one end of the housing arranged to force air between the fins of the cooling portions of the upper and lower walls of the housing and the top and bottom cover plates.
Figure 3:
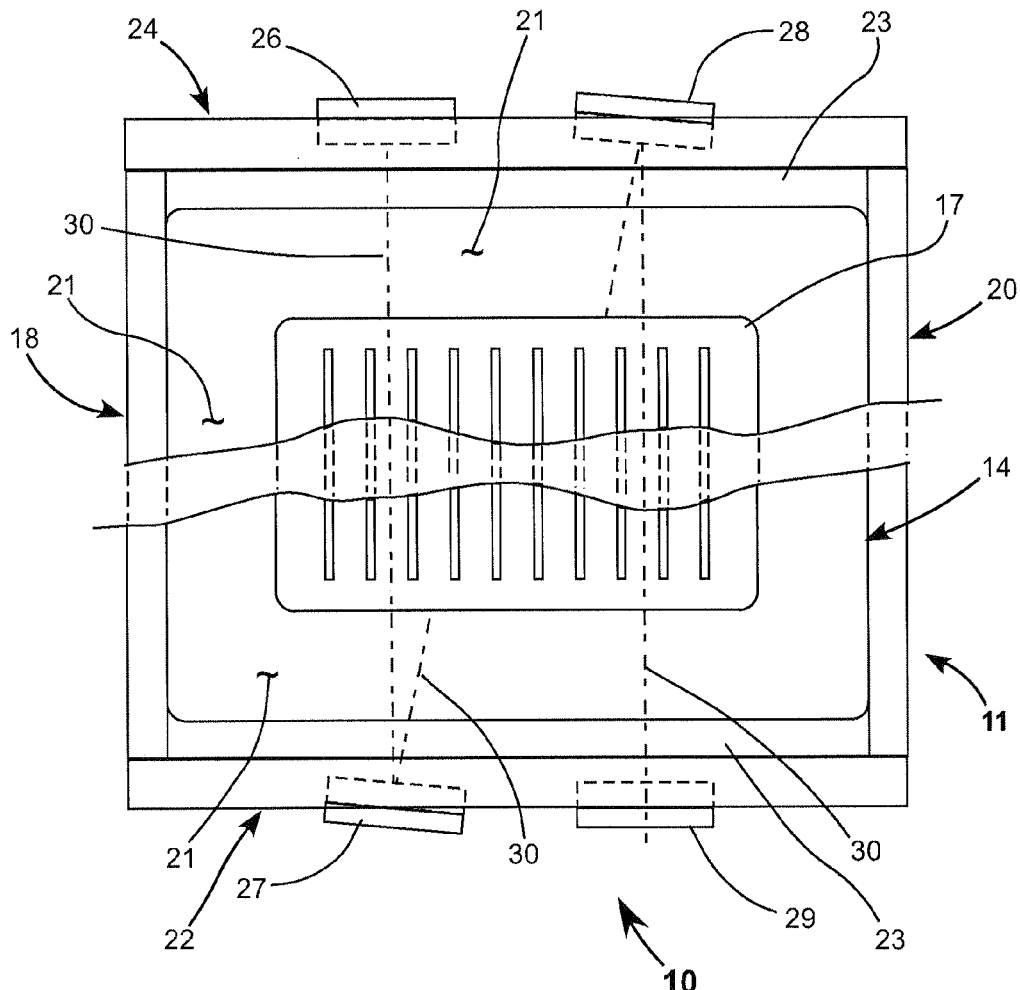
FIG. 3 is a plan-view from above schematically illustrating further details of the cooling fins and the diaphragm portion of the housing.

It should be noted, here, that details of mirror mounting arrangements including means for aligning the mirrors are omitted from FIGS. 1-3 for simplicity of illustration. Details of such arrangements are described in U.S. Pat. No. 6,192, 061, assigned to the assignee of the present invention and the complete disclosure of which is hereby incorporated by reference. It should also be noted that the Z-fold waveguide resonator described, here is but one example of a laser resonator configuration that can be incorporated in housing 11. Those skilled in the art to which the present invention pertains may chose to incorporate other resonator configurations without departing from the spirit and scope of the present invention. Such other configurations include, but are not limited to, unstable resonators with slab laser discharges, folded free-space Gaussian-mode resonators in slab laser discharges, or folded resonators in hollow ceramic discharge tubes. It will be recognized, of course, that whatever the resonator configuration, there will be at leased one mirror attached to each of end walls 22 and 24.

Located in enclosure 12 is an electrode-and-discharge-channel assembly 34, hereinafter, referred to simply as an electrode assembly. Only selected components of the electrode assembly are numerically designated in FIG. 1 and FIG. 2 for simplicity of illustration. All components of the electrode assembly are numerically designated in FIG. 1A. Components of the electrode assembly are not shown in FIG. 3.

Figure 1A:
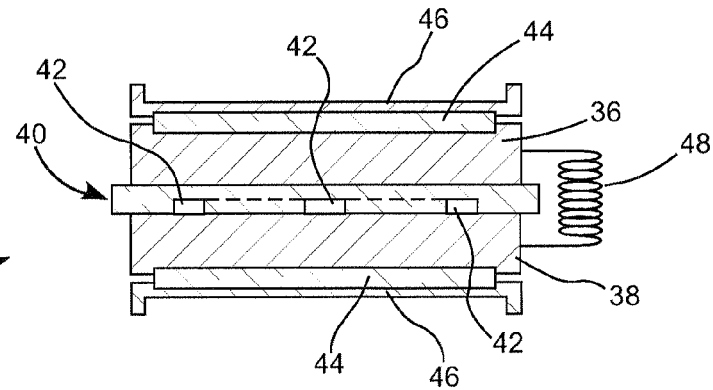
FIG. 1A is a lateral cross-section view depicting the electrode and discharge-channel assembly of FIG. 1, outside of the housing of FIG. 1.

Electrode assembly 34 is in thermal contact with upper and lower walls 14 and 16 of the housing. The electrode assembly includes upper and lower electrodes 36 and 38 respectively. Sandwiched between the electrodes is a slab 40 of an electrically insulating material, most preferably an electrically insulating material having a relatively high thermal conductivity, such as an aluminum oxide ceramic or a beryllium oxide ceramic. In slab 40 there are open-ended discharge channels 42, here, two parallel channels having a diagonal channel therebetween. These channels contain a discharge that is excited in the lasing gas mixture when an electrical potential (typically an RF potential) is applied to the electrodes. Referring in particular to FIG. 1A, covering each of the electrodes is an insulator 44 and covering each insulator is a metal cap 46. It is usual to include a plurality of inductances 48 (only one thereof visible in FIG. 1A) spaced apart along the electrodes and joining the electrodes. One purpose of such inductors is to flatten out the voltage distribution along the electrode length. This prevents discharge "hot-spots" from occurring along the length of the discharge. When assembled into enclosure 12 housing 11, the electrode assembly should be in thermal contact with the rigid portions 17 of each of the upper and lower walls of the enclosure.

In the electrode assembly of FIG. 1A either of the electrodes could be selected as a live or "hot" electrode to which RF potential applied, with the other electrode grounded by connecting that electrode via a suitable lead the housing and grounding the housing. It is also possible to have the grounded electrode directly in contact with the housing by omitting the corresponding insulator 44. This, however, would detract from the symmetry of the electrode assembly.

Continuing now with a description of the configuration of upper and lower walls 14 and 16 of housing 11, each of the walls includes a rigidly configured central portion or cooling-member 17, having cooling fins 19 extending outwardly therefrom and parallel to the length direction of the housing. As in this example the upper and lower walls are identically configured, only features of upper wall 14 are numerically designated, for simplicity of illustration.

Rigid central wall-portion 17 is surrounded by a relatively thin membrane-portion or diaphragm-portion 21. In a case where an extrusion is used to form walls of housing 11, walls 14 and 16 can initially have a uniform thickness with diaphragm-portion 21 thereof subsequently formed by machining a channel in each the walls. This circumferential channel can extend all of the way between rigid-portion 17 and the sidewalls, as depicted in FIG. 1. It is, however, advisable to leave thickened portions 23 on each end of each one of the upper and lower walls (see FIGS. 2 and 3) to facilitate attaching and sealing end-walls 22 and 24 to the housing.

Regarding exemplary dimensions of housing 11, the housing for a 70.0 W waveguide $CO_2$ laser may have a length of about 54.0 centimeters (cm) a width of about 10.0 cm, and a height of about 6.0 cm. Diaphragm portion 21 of the upper and lower walls may have a width of about 2.0 cm and a thickness of about 0.16 cm. In general the diaphragm portion of the upper and lower walls preferably has a width to thickness ratio greater than about 10:1.

Components of electrode assembly 34 that are in thermal contact with the upper and lower walls as discussed above should not extend longitudinally or laterally under the diaphragm portions of the walls. The diaphragm portions of the upper and lower walls preferably have a width to thickness ratio sufficiently high that rigid-portions 17 of the upper and lower walls can move (piston-like) as indicated in FIG. 1 by arrows A, in response to a difference in pressure between the inside and outside of enclosure 12. When the pressure inside the enclosure is less than the pressure (atmospheric pressure) outside of the enclosure, absent any other constraint, rigid portions 17 of the upper and lower walls will be urged toward each other with a force sufficient to maintain electrode assembly 34 in contact with the rigid portions of the upper and lower walls.

Side-walls 18 and 20 of housing 11 extend above upper wall 14 and below lower wall 16 preferably sufficient to barely clear longitudinally-extending cooling fins 19. Upper and lower cover plates 50 and 52 respectively are attached to the housing via side-walls 18 and 20. Screws 54 and 56 extend through apertures 58 and 60, respectively, in cover plates 50 and 52, respectively, and engage threaded apertures not specifically designated in rigid portions 17 of the upper and lower walls. The diaphragm (flexure) portion 21 of the upper and lower walls provides that turning the screws in one direction can be used to slightly raise the rigid portions of the upper and lower walls, for example, to draw the rigid portions of the walls apart.

Drawing the rigid-portions of the upper and lower walls apart (there must be sufficient clearance between the upper and lower cover plates and cooling fins 19 to permit this) can facilitate installation of electrode assembly 34 in enclosure 12. Additional screws 62 and 64, threaded through plates 50 and 52, respectively, can be used to urging the rigid portions of the walls together and provide a hard clamping force on the electrode assembly. After housing 11 has been made gas-tight and pressure inside enclosure 12 is less than pressure outside enclosure 12, screws 62 and 64 may be left in place to retain the hard clamping force or removed to allow the pressure difference between the interior and exterior to provide a clamping force on the electrode assembly.

Whether the electrode assembly is clamped by a hard clamping force, or clamped by a force due to pressure difference the diaphragm portions of the upper and lower walls of the housing provides mechanical decoupling of the rigid portions of the upper and lower walls and the electrode assembly clamped therebetween from the side walls and end walls that provide support for the laser resonator. Accordingly, while the highly symmetrical arrangement of the upper and lower walls of the electrode assembly will minimize the possibility of thermal distortion of that assembly any such distortion will not be transmitted to the laser resonator and thermally induced beam pointing errors will be minimized. The provision of cooling fins on both upper and lower walls of the enclosures optimizes the absolute air-cooling of the enclosure.

In FIG. 2 an arrangement is depicted which can further optimize air cooling. Here, side-walls 18 and 20 of housing 11 (only wall 18 visible in FIG. 2) and upper and cover plates 50 and 52 are extended beyond end wall 24 of the housing. At the end of the extension of the walls and plates is located a fan-assembly 70 including fan-blades 72. A baffle 74 is provided to provide some direction of air flow. One mode of operation of the fan forces air through the space, including cooling fins 19, between each of the upper and lower walls of the housing and the corresponding cover plate as indicated by dotted lines 76. Such forced-air cooling could be still further optimized by configuring cooling fins 19 to provide turbulent air-flow therebetween by any means known in the art, for example, by providing two sets of fins laterally staggered such that fins of one set are aligned with spaces between fins in the other set.

Figure 4:
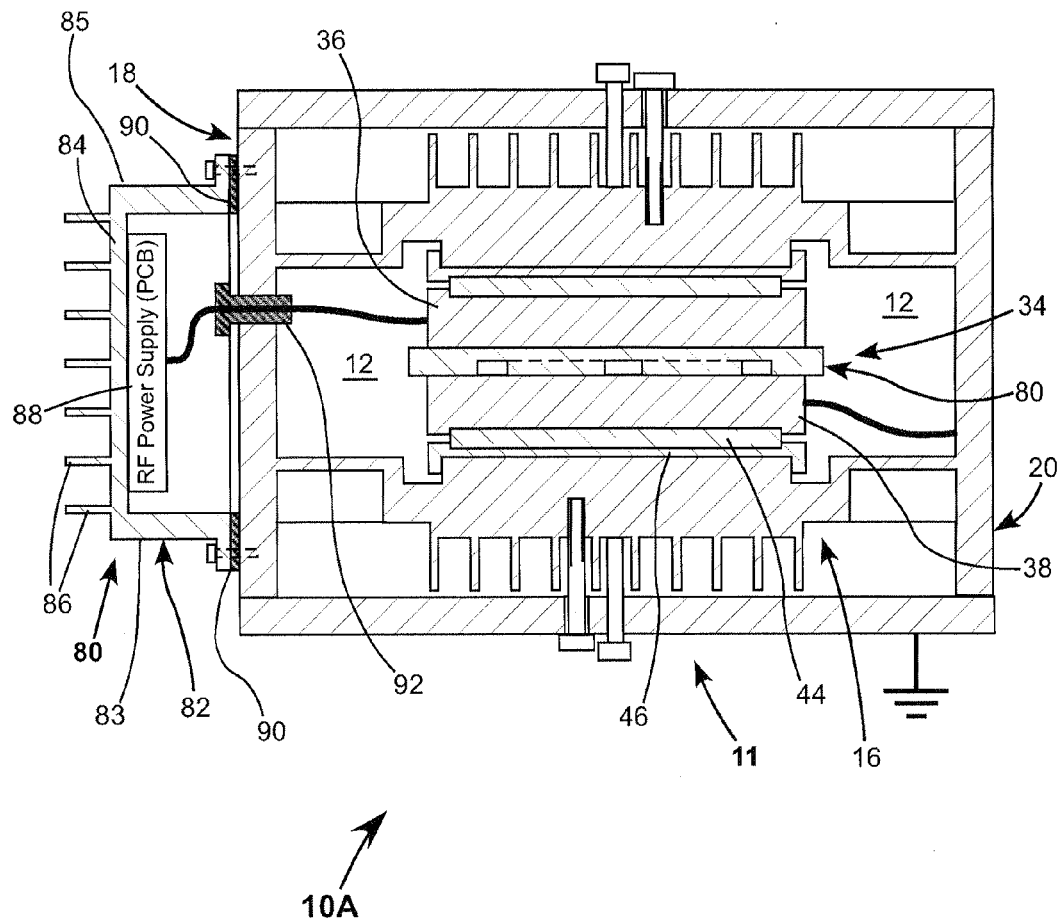
FIG. 4 is a is a lateral cross-section view schematically illustrating one arrangement in accordance with the present invention for attaching an RF power supply to the gas-discharge laser of FIG. 1.

FIG. 4 schematically illustrates an example 10A of laser 10, in which is illustrated an arrangement for mounting an RF power-supply 80 to housing 11, the power supply being used to apply RF potential across electrodes 36 and 38. Here, power supply 80 has a cover 82 that is mounted on side-wall 18 of laser housing 11, i.e., on a wall perpendicular to the plane of electrodes 36 and 38 and the folded resonator. In the mounting and configuration the power supply, steps are taken to optimize cooling of the power supply and minimizing transfer to housing 11 of any heat that can not be removed by the cooling.

Power supply 80 includes a metal cover 82 having a top portion 84 remote from side-wall wall 18. Cover-portion 84 has cooling fins 90 on an outer surface thereof to promote cooling thereof. Electronic circuitry of the RF power supply is assembled on a printed circuit board (PCB) 88. PCB board 88 is mounted in thermal contact with top 84, of the cover to facilitate transfer of heat from the circuitry to the top of the cover, and place the circuitry remote from side-wall 18 of the housing. Cover 82 is preferably open ended, i.e., the cover preferably has only top 84 and two sides 83 and 85. This allows air to circulate through the cover to assist in cooling the electronic circuitry. In order to minimize the transfer of any heat that can not be removed by these cooling measures, cover 82 is mounted on the side-wall with a gasket 90, having a relatively low thermal conductivity, located between the cover and the side wall. One suitable material for the gasket is an epoxy/fiberglass material.

RF potential from PCB 88 is connected, via an electrically insulating feed-through 92 in side-wall 18, to upper electrode 36 of electrode assembly 34. This would usually be termed the "hot" electrode by practitioners of the art. Lower electrode 38 of the electrode assembly is electrically connected to side-wall 20 of housing 11, which can be electrically grounded.

In summary a gas-discharge laser is described above that includes a housing having a symmetrical arrangement of upper and lower cooling members for removing heat generated in gas-discharge excited by an electrode assembly. The electrode assembly is clamped between the cooling members and is itself essentially symmetrically arranged. These symmetrical arrangements minimize the possibility of bending or distorting the electrode assembly. The cooling members and the electrode assembly held therein are mechanically isolated in the housing by a surrounding diaphragm that connects the cooling members to side-walls of the housing. This reduces the possibility of any distortion of the electrode assembly that does occur being transmitted to the side walls of the housing.

An RF power-supply for supply the electrode assembly is mounted on one of the sidewalls to avoid disturbing the symmetry of the cooling and electrode arrangements. Heat generating components in the power supply are separately cooled by the lid of an open-ended cover and are spaced apart from the housing. The cover is thermally insulated from the housing.

It should be noted, here, that while the terms "upper", "lower", "side", and the like are used to designate certain components, this is merely for convenience of restriction. A laser in accordance with the present invention is not limited to operation in any particular orientation.

The present invention is described above in terms of a preferred and other embodiments. The invention is not limited, however, to the embodiments described and depicted. Rather, the invention is limited only by the claims appended hereto.

What is claimed is:

1. A gas-discharge laser, comprising:
   a gas tight housing having first and second opposite longitudinal metal walls each thereof connected to third and fourth opposite longitudinal metal walls, the housing being closed by first and second end walls, said housing holding a laser gas mixture at a pressure less than atmospheric pressure; and
   each of the first and second longitudinal walls having a rigid cooling portion surrounded by a flexible thin membrane portion located between cooling portion and third and fourth longitudinal walls and the end walls said flexible thin membrane permitting the first and second longitudinal walls to move in response to pressure differences between the inside and the outside of the housing.

2. The laser of claim 1, wherein a plurality of cooling fins extends outwardly from the cooling portion of each wall.

3. The laser of claim 2, wherein the first, second, third, and forth longitudinal walls are formed from a single extrusion of one of aluminum and an alloy of aluminum.

4. The laser of claim 2, wherein the first and second walls have a similar first configuration and the third and fourth walls have a similar second configuration such that the housing has an essentially symmetrical configuration.

5. The laser of claim 4, wherein the third and fourth longitudinal walls extend laterally beyond the first and second longitudinal walls and wherein there are first and second cover plates, the first cover plate being attached to the third and fourth wall over the cooling fins of the first longitudinal wall and the second cover plate being attached to the third and fourth walls over the cooling fins of the second longitudinal wall, and wherein there is a fan located adjacent one end of the housing and arranged to cause air flow generally longitudinally between the first longitudinal wall and the first cover plate and between the second cover plate and the second cooling plate and accordingly between the cooling fins of both the first and second longitudinal walls.

6. The laser of claim 2, wherein each of the first and second end-walls has at least one mirror mounted thereon for forming a laser resonator in the housing.

7. The laser of claim 6, wherein there are first and second mirrors one the first end wall and third and fourth mirrors on the second end wall and the laser resonator is a Z-folded laser resonator having a resonator axis extending sequentially between the first, third, second, and fourth mirrors.

8. The laser of claim 6, further including an electrode assembly located in the housing between the cooling portions of the first and second walls, the electrode assembly including first and second electrodes aligned with each other and spaced apart from each other with the first electrode in thermal contact with the cooling portion of the first longitudinal wall, and the second electrode in thermal communication with the cooling portion of the second longitudinal wall, and wherein the laser resonator extends between the electrodes.

9. The laser of claim 8, further including a slab of a thermally conductive, electrically insulating material located between the first and second electrodes in thermal contact therewith, the slab having at least one channel therein through which the laser resonator extends.

10. The laser of claim 9, wherein the insulating material of the slab includes one of an aluminum oxide ceramic and a beryllium oxide ceramic.

11. The laser of claim 9, wherein the first electrode is electrically insulated from the first longitudinal wall by a first plate of a thermally conductive electrically insulating material and the second electrode is electrically insulated from the second longitudinal wall by a second plate of a thermally conductive electrically insulating material.

12. The laser of claim 11, wherein there is a first metal plate between the first plate of thermally conductive electrically insulating material and the first electrode and a second metal plate between the second plate of thermally conductive electrically insulating material and the second electrode.

13. The laser of claim 8, further including an electrical power supply mounted outside of the housing on the third longitudinal wall and arranged to apply an electrical potential to one of the first and second electrodes, the power supply being thermally insulated from the third longitudinal wall.

14. The laser of claim 13, wherein the electrical potential is an RF potential.

15. The laser of claim 14, wherein the power supply includes an open-ended cover having a first wall spanning second and third walls, and wherein there is an electronic circuit board for generating the RF potential mounted on the inside of the first wall of the cover and the second and third walls of the cover are attached to the third longitudinal wall of the housing via a thermally insulating spacer.

16. A gas-discharge laser, comprising:
a housing containing a lasing gas mixture, the housing having first and second opposite longitudinal metal walls each thereof connected to third and fourth opposite longitudinal metal walls, the housing being closed by first and second end walls;
first and second electrodes located in the housing spaced apart and parallel to each other and in thermal communication with respectively the first and second longitudinal walls; and
an electrical power supply mounted outside of the housing on the third longitudinal wall and arranged to apply an electrical potential to one of the first and second electrodes, the power supply being thermally insulated from the third longitudinal wall wherein the electrical potential is an RF potential and wherein the power supply includes an open-ended cover having a first wall spanning second and third walls, and wherein there is an electronic circuit board for generating the RF potential mounted on the inside of the first wall of the cover and the second and third walls of the cover are attached to the third longitudinal wall of the housing via a thermally insulating spacer.

17. A gas laser comprising:
a gas tight housing, said housing having opposed top and bottom walls and a pair of opposed side walls extending between the top and bottom walls, said top, bottom and side walls being formed from a single metal extrusion, said housing holding a laser gas mixture at a pressure less than atmospheric pressure;
a pair of end walls for sealing the enclosure; and
an electrode assembly located between and supported by the top and bottom walls, said electrode assembly being spaced from the side walls and the end walls, and wherein said top and bottom walls include a circumferential thin membrane flexure portion located in the region between the electrode assembly and the respective side and end walls said flexible thin membrane flexure portion permitting the top and bottom walls to move in response to pressure differences between the inside and the outside of the housing.

18. A laser as recited in claim 17, wherein the outer surfaces of the top and bottom walls include cooling fins.

19. A laser as recited in claim 18, further including top and bottom caps mounted to said side walls and spaced from the top and bottom walls and defining an air cooling channel.

20. A laser as recited in claim 17, wherein the resonator mirrors are mounted on the end walls.

21. A laser as recited in claim 17, wherein the electrode assembly includes a ceramic member having waveguide channels formed therein, said ceramic member being sandwiched between a pair of metal electrodes.

22. A gas-discharge laser, comprising:
a housing having first and second opposite longitudinal metal walls each thereof connected to third and fourth opposite longitudinal metal walls, the housing being closed by first and second end walls, said ends wall having a least one mirror mounted thereon for forming a laser resonator in the housing;
each of the first and second longitudinal walls having a rigid cooling portion surrounded by a flexible portion located between cooling portion and the third and fourth longitudinal walls and the end walls;
an electrode assembly located in the housing between the cooling portions of the first and second walls, the electrode assembly including first and second electrodes aligned with each other and spaced apart from each other with the first electrode in thermal contact with the cooling portion of the first longitudinal wall, and the second electrode in thermal communication with the cooling portion of the second longitudinal wall, and wherein the laser resonator extends between the electrodes; and
a slab of a thermally conductive, electrically insulating material located between the first and second electrodes in thermal contact therewith, the slab having at least one channel therein through which the laser resonator extends and wherein the insulating material of the slab includes one of an aluminum oxide ceramic and a beryllium oxide ceramic and wherein the first electrode is electrically insulated from the first longitudinal wall by a first plate of a thermally conductive electrically insulating material and the second electrode is electrically insulated from the second longitudinal wall by a second plate of a thermally conductive electrically insulating material and wherein there is a first metal plate between the first plate of thermally conductive electrically insulating material and the first electrode and a second metal plate between the second plate of thermally conductive electrically insulating material and the second electrode.

23. A gas-discharge laser, comprising:

a housing having first and second opposite longitudinal metal walls each thereof connected to third and fourth opposite longitudinal metal walls, the housing being closed by first and second end walls, said end walls having at least one mirror mounted thereon for forming a laser resonator in the housing;

each of the first and second longitudinal walls having a rigid cooling portion surrounded by a flexible portion located between cooling portion and third and fourth longitudinal walls and the end walls;

an electrode assembly located in the housing between the cooling portions of the first and second walls, the electrode assembly including first and second electrodes aligned with each other and spaced apart from each other with the first electrode in thermal contact with the cooling portion of the first longitudinal wall, and the second electrode in thermal communication with the cooling portion of the second longitudinal wall, and wherein the laser resonator extends between the electrodes; and an electrical power supply mounted outside of the housing on the third longitudinal wall and arranged to apply an electrical potential to one of the first and second electrodes, the power supply being thermally insulated from the third longitudinal wall, wherein the electrical potential is an RF potential and wherein the power supply includes an open-ended cover having a first wall spanning second and third walls, and wherein there is an electronic circuit board for generating the RF potential mounted on the inside of the first wall of the cover and the second and third walls of the cover are attached to the third longitudinal wall of the housing via a thermally insulating spacer.

24. A gas-discharge laser, comprising:

a housing having first and second opposite longitudinal metal walls each thereof connected to third and fourth opposite longitudinal metal walls, the housing being closed by first and second end walls, wherein the first end wall includes first and second mirrors and the second end wall includes third and fourth mirrors, said mirrors forming a Z-folded laser resonator having a resonator axis extending sequentially between the first, third, second, and fourth mirrors;

each of the first and second longitudinal walls having a rigid cooling portion surrounded by a flexible thin membrane portion located between cooling portion and third and fourth longitudinal walls and the end walls said flexible thin membrane permitting the first and second longitudinal walls to move in response to pressure differences between the inside and the outside of the housing; and a plurality of cooling fins extending outwardly from the cooling portion of each wall.

* * * * *